(12) United States Patent
Jeon et al.

(10) Patent No.: US 12,301,981 B2
(45) Date of Patent: May 13, 2025

(54) ELECTRONIC DEVICE INCLUDING A PLURALITY OF CAMERAS AND OPERATING METHOD THEREOF

(71) Applicant: Samsung Electronics Co., Ltd., Suwon-si (KR)

(72) Inventors: Jaehee Jeon, Suwon-si (KR); Bohee Lee, Suwon-si (KR); Byungho Ahn, Suwon-si (KR); Sungoh Kim, Suwon-si (KR); Hajeong Kim, Suwon-si (KR); Jiyoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 17/987,400

(22) Filed: Nov. 15, 2022

(65) Prior Publication Data
US 2023/0074962 A1    Mar. 9, 2023

Related U.S. Application Data

(63) Continuation of application No. PCT/KR2022/006308, filed on May 3, 2022.

(30) Foreign Application Priority Data

May 6, 2021 (KR) .......................... 10-2021-0058711

(51) Int. Cl.
H04N 23/63    (2023.01)

(52) U.S. Cl.
CPC ......... *H04N 23/632* (2023.01); *H04N 23/635* (2023.01)

(58) Field of Classification Search
CPC ........ H04N 23/81; H04N 23/62; H04N 23/69; H04N 23/667; H04N 23/631; H04N 23/55;
(Continued)

(56) References Cited

U.S. PATENT DOCUMENTS 8,478,347 B2    7/2013   Kim et al.
10,122,931 B2   11/2018  Bernstein et al.
(Continued)

FOREIGN PATENT DOCUMENTS

CN    111010506 A    4/2020
CN    111212235 A    5/2020
(Continued)

OTHER PUBLICATIONS

European Search Report dated Jun. 27, 2024, issued in European Application No. 22799086.8.

*Primary Examiner* — Xi Wang
(74) *Attorney, Agent, or Firm* — Jefferson IP Law, LLP

(57) ABSTRACT

An electronic device is provided. The electronic device includes obtaining a first image corresponding to a first field-of-view through a first camera, obtaining a second image corresponding to a second field-of-view wider than the first field-of-view through a second camera, determining a third image corresponding to a partial area of the second image based on a range in which the first field-of-view may move through a field-of-view movement means, displaying the first image on the first area of the display, displaying the third image on a second area smaller than the first area of the display, receiving a user input with respect to one point of the second area of the display, controlling, in response to the reception of the user input, the field-of-view movement means so that a subject corresponding to the one point of the second area is located within the first field-of-view, and displaying, on the first area of the display, an image obtained through the first camera and corresponding to a first field-of-view moved according to control of the field-of-view movement means.

20 Claims, 12 Drawing Sheets

(58) Field of Classification Search
CPC .... H04N 23/45; H04N 5/2628; H04N 5/2624; G02B 13/04; G02B 13/009
See application file for complete search history.

(56) References Cited

U.S. PATENT DOCUMENTS

| | | | |
|---|---|---|---|
| 10,154,186 B2* | 12/2018 | Kang | .............. H04N 23/62 |
| 10,371,928 B2 | 8/2019 | Goldenberg et al. | |
| 10,412,298 B2 | 9/2019 | Li | |
| 10,419,690 B2 | 9/2019 | Wang et al. | |
| 10,599,920 B2 | 3/2020 | Mojaver | |
| 2002/0180759 A1 | 12/2002 | Park et al. | |
| 2012/0300051 A1 | 11/2012 | Daigo et al. | |
| 2016/0028949 A1 | 1/2016 | Lee et al. | |
| 2018/0152639 A1 | 5/2018 | Li | |
| 2020/0103726 A1 | 4/2020 | Shabtay et al. | |
| 2020/0120284 A1 | 4/2020 | Kini et al. | |
| 2020/0221026 A1* | 7/2020 | Fridman | .............. H04N 23/698 |
| 2020/0244854 A1 | 7/2020 | Lee et al. | |
| 2020/0267320 A1 | 8/2020 | Song et al. | |
| 2021/0120158 A1 | 4/2021 | Shabtay et al. | |
| 2021/0168300 A1* | 6/2021 | Wang | .............. H04N 23/698 |
| 2022/0159183 A1 | 5/2022 | Li et al. | |
| 2022/0394190 A1 | 12/2022 | Cui et al. | |
| 2023/0014757 A1 | 1/2023 | An | |
| 2023/0081664 A1 | 3/2023 | Li | |

FOREIGN PATENT DOCUMENTS

| | | |
|---|---|---|
| JP | 2009/244369 A | 10/2009 |
| JP | 2013/013050 A | 1/2013 |
| KR | 10-2018-0054825 A | 5/2018 |
| KR | 10-2019-0025762 A | 3/2019 |
| KR | 10-2020-0098029 A | 8/2020 |
| KR | 10-2020-0101180 A | 8/2020 |
| KR | 10-2157675 B1 | 9/2020 |
| KR | 10-2021-0003856 A | 1/2021 |
| WO | 2020/186969 A1 | 9/2020 |

* cited by examiner

ELECTRONIC DEVICE INCLUDING A PLURALITY OF CAMERAS AND OPERATING METHOD THEREOF

CROSS-REFERENCE TO RELATED APPLICATION(S)

This application is a continuation application, claiming priority under § 365(c), of an International application No. PCT/KR2022/006308, filed on May 3, 2022, which is based on and claims the benefit of a Korean patent application number 10-2021-0058711, filed on May 6, 2021, in the Korean Intellectual Property Office, the disclosure of which is incorporated by reference herein in its entirety.

TECHNICAL FIELD

The disclosure relates to a technology for capturing images by using a plurality of cameras.

BACKGROUND ART

In line with recent diversification of the function of mobile devices, there have been increasing demands for improvement of image capture functions using mobile devices. Accordingly, zoom magnifications supported by electronic devices during image capture are increasing.

When configured to have a specific zoom magnification or higher, an electronic device may display a user interface (UI) referred to as a zoom map together with a preview image on a display thereof. The electronic device may provide the user with information regarding the position of the field of view (FOV) (or angle of view (AOV)) of the preview image through the zoom map.

The above information is presented as background information only to assist with an understanding of the disclosure. No determination has been made, and no assertion is made, as to whether any of the above might be applicable as prior art with regard to the disclosure.

DISCLOSURE

Technical Problem

According to the prior art, a preview image displayed on a display by an electronic device has a fixed field of view (FOV). In order to move the FOV of the preview image in connection with the electronic device according to the prior art such that an image having a different FOV is acquired, the electronic device needs to be moved. For example, the user needs to move the electronic device to capture an image having a different FOV from the current preview image among images displayed on the zoom map. This poses a problem in that, if the electronic device is moved in a high-magnification environment, images are easily blurred severely. In addition, there is another problem in that, if the FOV of the preview image is narrow, the user has difficulty in moving the FOV to a desired position.

Aspects of the disclosure are to address at least the above-mentioned problems and/or disadvantages and to provide at least the advantages described below. Accordingly, an aspect of the disclosure is to provide a technology for capturing images by using a plurality of cameras.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first camera having a first field-of-view, a second camera having a second field-of-view wider than the first field-of-view, a field-of-view movement optical element configured to control a path of light incident to the first camera so as to move the first field-of-view, a display including a first area and a second area smaller than the first area, and at least one processor electrically connected to the first camera, the second camera, the field-of-view movement optical element, and the display. The at least one processor may obtain a first image corresponding to the first field-of-view through the first camera, obtain a second image corresponding to the second field-of-view through the second camera, determine a third image corresponding to a partial area of the second image based on a range in which the first field-of-view is movable, display the first image on the first area of the display, display the third image on the second area of the display, receive a user input with respect to one point of the second area of the display, control, in response to the user input, the field-of-view movement optical element so that a subject corresponding to the one point of the second area is located within the first field-of-view, and display, on the first area of the display, an image obtained through the first camera and corresponding to a movement of the first field-of-view according to the control of the field-of-view movement optical element.

In accordance with another aspect of the disclosure, an operating method performed by an electronic device is provided. The operating method includes obtaining a first image corresponding to a first field-of-view through a first camera included in the electronic device, obtaining a second image corresponding to a second field-of-view wider than the first field-of-view through a second camera included in the electronic device, determining a third image corresponding to a partial area of the second image based on a range in which the first field-of-view is movable by controlling a path of light incident to the first camera through a field-of-view movement optical element included in the electronic device, displaying the first image on a first area of a display included in the electronic device, displaying the third image on a second area smaller than the first area of the display, receiving a user input with respect to one point of the second area of the display, controlling, in response to the user input, the field-of-view movement optical element so that a subject corresponding to the one point of the second area is located within the first field-of-view, and displaying, on the first area of the display, an image obtained through the first camera and corresponding to a movement of the first field-of-view according to the controlling of the field-of-view movement optical element.

Advantageous Effects

According to various embodiments disclosed herein, an electronic device may move the FOV of a preview image. A user may acquire an image having a FOV different from the preview image even if the electronic device is not moved. Therefore, the electronic device may reduce blurring included in images, and may acquire images having various FOVs.

Advantageous effects obtainable from the disclosure are not limited to the above-mentioned advantageous effects, and other advantageous effects not mentioned herein will be clearly understood by those skilled in the art to which the disclosure pertains.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
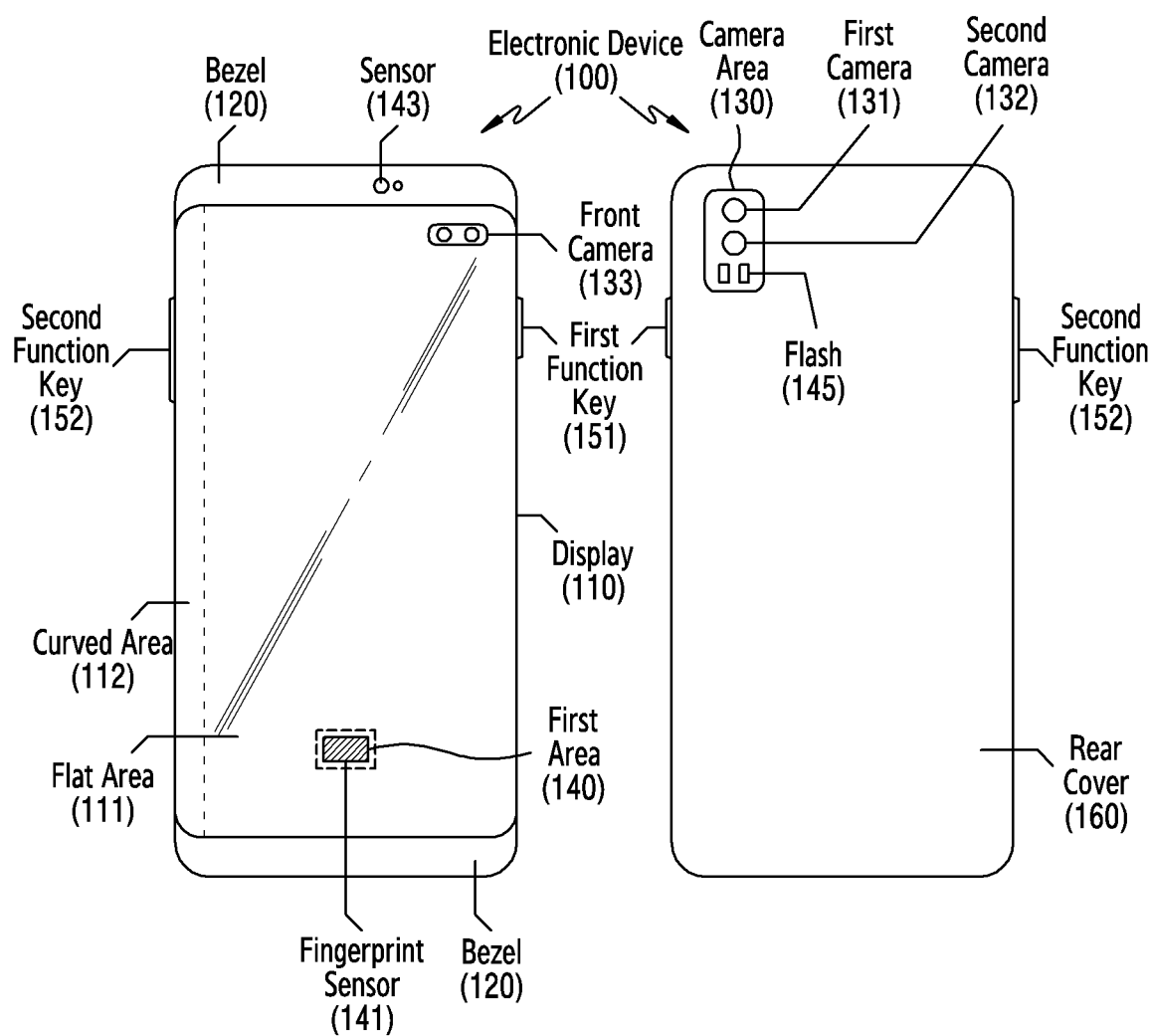
FIG. 1 illustrate an electronic device according to an embodiment of the disclosure.

FIG. 1 illustrates an electronic device 100 according to an embodiment of the disclosure.

Referring to FIG. 1, a display 110 may be disposed on a front surface of the electronic device 100 according to an embodiment. In an embodiment, the display 110 may occupy most of the front surface of the electronic device 100. The display 110 and a bezel 120 area configured to surround at least a partial edge of the display 110 may be disposed on the front surface of the electronic device 100. In the embodiment of FIG. 1, the display 110 may include a flat area 111 and a curved area 112 extending from the flat area 111 to a lateral side of the electronic device 100. Although FIG. 1 illustrates the curved area 112 on only one side (for example, a left side), it may be understood that the curved area is also formed on the opposite side. In addition, the electronic device 100 shown in FIG. 1 is merely one embodiment and various embodiments are possible. For example, the display 110 of the electronic device 100 may include the flat area 111 without the curved area 112 or may include the curved area 112 on only one side edge rather than both side edges. Furthermore, in an embodiment, the curved area may extend to a rear surface of the electronic device 100 so that the electronic device 100 may include an additional flat area.

In an embodiment, a fingerprint sensor 141 for recognizing a user fingerprint may be included on a first area 140 of the display 110. The fingerprint sensor 141 may be disposed on a layer under the display 110 so that the sensor may not be recognized or may be difficult to be recognized by the user. In addition, a sensor rather than the fingerprint sensor 141 for additional user/biometric authentication may be disposed on a partial area of the display 110. In another embodiment, the sensor for user/biometric authentication may be disposed on one area of the bezel 120. For example, an infrared (IR) sensor for iris authentication may be exposed through one area of the display 110 or one area of the bezel 120.

In an embodiment, a sensor 143 may be included in at least one area of the bezel 120 or at least one area of the display 110 of the electronic device 100. The sensor 143 may be a sensor for distance detection and/or a sensor for object detection. The sensor 143 may be disposed adjacent to a camera module (for example, a front camera 133) or may be formed as a single module with a camera module. For example, the sensor 143 may be operated as at least a portion of an infrared (IR) camera (for example, a time-of-flight (TOF) camera or a structured light camera) or at least a portion of a sensor module.

In an embodiment, a front camera 133 may be disposed on a front surface of the electronic device 100. The embodiment in FIG. 1 illustrates that the front camera 133 is exposed through one area of the display 110, but the front camera 133 may be exposed through the bezel 120 in another embodiment.

In an embodiment, at least one of a sensor module, a camera module (for example, the front camera 133), and a light-emitting element (for example, LED) may be disposed on a back surface of a screen display area (for example, the flat area 111 and the curved area 112) of the display 110.

In an embodiment, on a back surface of at least one of front, lateral, and/or rear surfaces of the electronic device 100, the camera module may be disposed to face the front, lateral, and/or rear surface. For example, the front camera 133 may include an under display camera (UDC) not visually exposed through the screen display area (for example, the flat area 111 and the curved area 112). In an embodiment, the electronic device 100 may include one or more front cameras 133. For example, the electronic device 100 may include two front cameras such as a first front camera and a second front camera. In an embodiment, the first front camera and the second front camera may be cameras of the same type having equivalent specifications (for example, a pixel) or the first front camera and the second front camera may be implemented as cameras having different specifications. The electronic device 100 may support a function (for example, three-dimensional (3D) photographing, auto focusing (AF), etc.) related to a dual camera through the two front cameras.

In an embodiment, a first camera 131 and a second camera 132 which are rear cameras may be disposed on the rear surface of the electronic device 100. The first camera 131 and the second camera 132 may be exposed through a camera area 130 of a rear cover 160.

According to an embodiment, the first camera 131 and the second camera 132 may have different specifications. For example, the first camera 131 and the second camera 132 may be different in terms of fields of view (FOV), pixels, apertures, whether to support an optical zoom/digital zoom, whether to support an image stabilization function (for example, optical image stabilization (OIS)), kinds and/or arrangement of lens set included in each camera, and the like. For example, the first camera 131 may be an ordinary camera having a first field-of-view and the second camera 132 may be a wide camera (or an ultra-wide camera) having a second field-of-view wider than the first field-of-view. In embodiments of the disclosure, the description about the function or characteristics of the front camera may be applied to the rear camera, and vice versa.

In an embodiment, various hardware such as a flash 145 for assisting with photographing may be additionally disposed on the camera area 130.

In an embodiment, at least one physical key may be disposed on a lateral side of the electronic device 100. For example, a first function key 151 configured to turn the display 110 ON/OFF or turn the power of the electronic device 100 ON/OFF may be disposed on a right edge with reference to the front surface of the electronic device 100. In an embodiment, a second function key 152 configured to control a volume or screen brightness of the electronic device 100 may be disposed on a left edge with reference to the front surface of the electronic device 100. In addition, an additional button or key may be disposed on the front surface or the rear surface of the electronic device 100. For example, a physical button or a touch button mapped to a specific function may be disposed on a lower end area of the bezel 120 on the front surface.

The electronic device 100 shown in FIG. 1 is merely an embodiment and does not limit the type of a device to which the technical idea disclosed herein is applied. For example, the technical idea disclosed herein may be applied to a foldable electronic device foldable in a vertical direction or horizontal direction by adopting a flexible display and a hinge structure. For example, although the electronic device 100 shown in the drawing illustrates a bar type or a plate type appearance, but various embodiments disclosed herein are not limited thereto. For example, the electronic device illustrated herein may be a portion of a rollable electronic device. The rollable electronic device may be understood as an electronic device in which the display 110 is bendable and transformable so that at least a portion thereof may be wound or rolled to be received in the electronic device 100. The rollable electronic device may extend a screen display area (for example, the flat area 111 and the curved area 112) to be used by unwinding or unrolling the display 110 or exposing a wider area of the display 110 to the outside according to user's needs. The display 110 may be referred to as a slide-out display or an expandable display.

Hereinafter, for the convenience of the description, various embodiments based on the electronic device 100 shown in FIG. 1 will be described.

Figure 2:
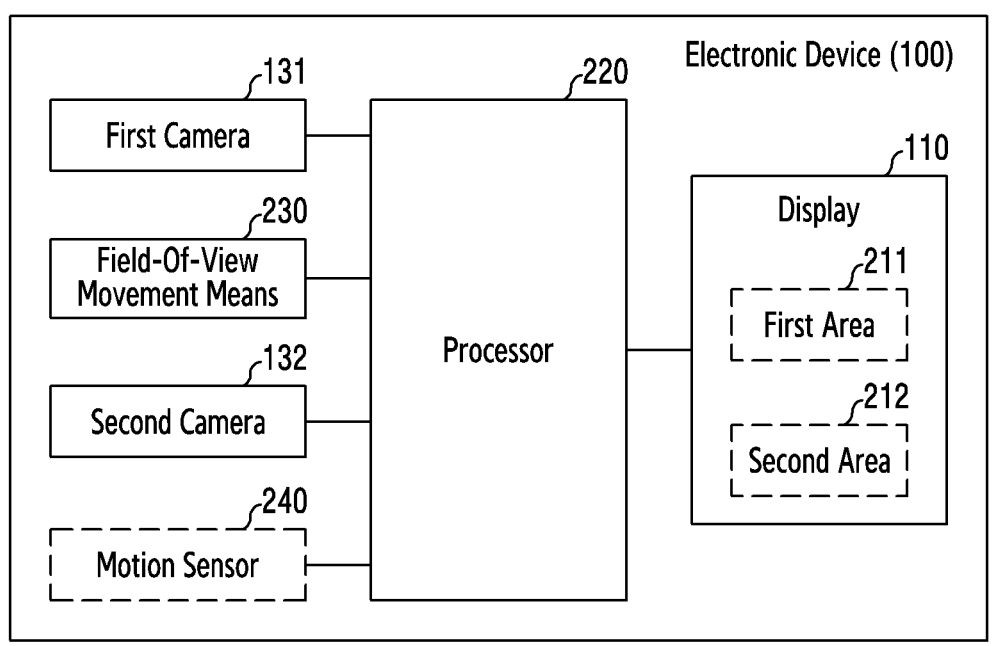
FIG. 2 is a block diagram illustrating a hardware configuration of an electronic device according to an embodiment of the disclosure.

FIG. 2 is a block diagram illustrating a hardware configuration of an electronic device 100 according to an embodiment of the disclosure.

Referring to FIG. 2, the electronic device 100 may include a first camera 131, a second camera 132, a field-of-view movement means 230, a processor 220, and a display 110. According to an embodiment, the electronic device 100 may further include a motion sensor 240. In an embodiment, among the configurations shown in FIG. 2, the configuration described in FIG. 1 may be briefly described or a description thereof may be omitted.

According to an embodiment, the first camera 131 may have a first field-of-view and the second camera 132 may have a second field-of-view wider than the first field-of-view. The processor 220 may obtain a first image having the first field-of-view through the first camera 131. The processor 220 may obtain a second image having the second field-of-view through the second camera 132. In an embodiment, the first field-of-view may be included in the second field-of-view. For example, a subject included in the first image may be included in the second image, and a portion of a subject included in the second image may not be included in the first image. In an embodiment, the first camera 131 may be an ordinary camera or a tele-camera, and the second camera 132 may be a wide camera or an ultra-wide camera. In another embodiment, the first camera 131 may be a telephoto camera and the second camera 132 may be an ordinary camera.

The field-of-view movement means 230 may be embodied by any optical element able to control a path of light incident to the first camera 131 to move the first field-of-view. The processor 220 may control the field-of-view movement means 230 to move the first field-of-view of the first camera 131. According to an embodiment, the field-of-view movement means 230 may be a prism. The processor 220 may control at least one of rotation direction or rotation angle of the prism. The processor 220 may control the prism to move the first field-of-view and obtain an image corresponding to the moved first field-of-view from the first camera 131. The description about the first camera 131, the second camera 132, and the field-of-view movement means 230 will be given below with reference to FIG. 3.

According to an embodiment, the processor 220 may be understood to include at least one processor. For example, the processor 220 may include at least one of an application processor (AP), an image signal processor (ISP), and a communication processor (CP).

According to an embodiment, an execution screen of an application (for example, a camera application, a gallery application) operated by the processor 220 may be displayed on the display 110. For example, the processor 220 may display, as a preview, a first image obtained through the first camera 131 or an image corresponding to a moved first field-of-view on the display 110.

According to an embodiment, the display 110 may include a first area 211 and a second area 212 smaller than the first area 211. In an embodiment, the second area 212 may be referred to as a zoom map. The description about the first area 211 and the second area 212 will be given below with reference to FIG. 4.

According to an embodiment, the display 110 may be integrally formed with a touch panel. The display 110 may support a touch function, detect a user input (for example, touch using a finger), and transfer the user input to the processor 220. According to an embodiment, the processor 220 may receive a user input through an area of the display 110. For example, the processor 220 may receive a user's touch input through an area of the display 110. According to an embodiment, the display 110 may be connected to a display driver integrated circuit (DDIC) for driving the display 110, and the touch panel may be connected to a touch IC configured to detect coordinates of a touch and process a touch-related algorithm In an embodiment, the display driver integrated circuit and the touch IC may be integrally formed. In another embodiment, the display driver integrated circuit and the touch IC may be separately formed. The display driver integrated circuit and/or the touch IC may be electrically connected to the processor 220.

According to an embodiment, the electronic device 100 may further include a motion sensor 240. The processor 220 may detect movement of the electronic device 100 through the motion sensor 240. In an embodiment, the motion sensor 240 may include an acceleration sensor, a gyro sensor (a gyroscope), a magnetic sensor, or a hall sensor. For example, the acceleration sensor may detect acceleration acting in 3 axes (for example, the X-axis, the Y-axis, or the Z-axis) of the electronic device 100. However, the sensors are merely exemplary, and the motion sensor may further include at least one other type of sensor. According to an embodiment, the motion sensor 240 may provide motion data corresponding to movement of the electronic device 100 to the processor 220.

Figure 3:
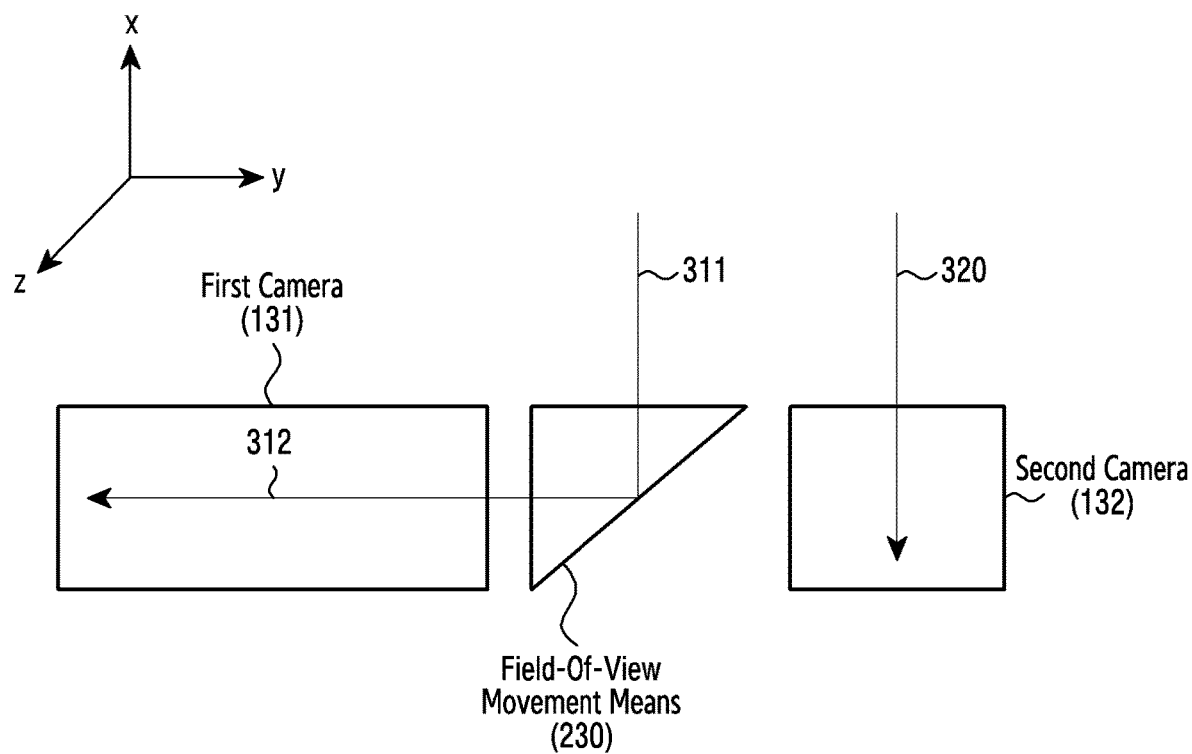
FIG. 3 schematically illustrates a first camera, a field-of-view movement means, and a second camera according to an embodiment of the disclosure.

FIG. 3 schematically illustrates a first camera 131, a field-of-view movement means 230, and a second camera 132 according to an embodiment of the disclosure.

FIG. 3 is a schematic diagram illustrating an operation of the first camera 131 and the field-of-view movement means 230 and the positional relationship of the first camera 131, the field-of-view movement means 230, and the second camera 132 is not limited thereto.

Referring to FIG. 3, it illustrates that the first camera 131, the field-of-view movement means 230, and the second camera 132 are arranged to be parallel in the y-axis direction, but various positional relationships in which, for example, the second camera 132 is disposed in the +z-axis direction with respect to the field-of-view movement means 230, and to which the technical idea described with reference to FIG. 3 may be applied, may be possible.

According to an embodiment, the electronic device 100 may obtain an image regarding light 311 and 320 incident in the −x-axis direction. For example, the electronic device 100 may obtain a first image corresponding to the incident light 311 through the first camera 131. In addition, the electronic device 100 may obtain a second image corresponding to the incident light 320 through the second camera 132.

According to an embodiment, the second camera 132 may obtain a second image having a second field-of-view regarding the light 320 incident in the −x-axis direction. The second camera 132 may provide the second image to the processor 220.

According to an embodiment, the field-of-view movement means 230 may adjust a path of the light 311 incident in the −x-axis direction. For example, the field-of-view movement means 230 may convert the light 311 incident in the x-axis direction by 90 degrees to reflect the same to proceed along the y-axis. The light 311 incident in the −x-axis direction may be converted into the light 312 proceeding in the −y-axis direction by the field-of-view movement means 230.

According to an embodiment, the first camera 131 may obtain a first image having a first field-of-view regarding the light 312 incident in the −y-axis direction. The first camera 131 may provide the first image to the processor 220.

According to an embodiment, the processor 220 may control the field-of-view movement means 230 to move the first field-of-view of the first camera 131. For example, the processor 220 may rotate the field-of-view movement means 230 around the x-axis, the y-axis, or the z-axis. The optical axis of the incident light 311 may be changed by a predetermined angle according to the rotation of the field-of-view movement means 230. The first camera 131 may obtain an image regarding light 312 formed by reflecting, in the −y-axis direction, light 311 incident along the changed optical axis by the field-of-view movement means 230.

According to an embodiment, the field-of-view movement means 230 may be a prism. According to an embodiment, the processor 220 may control at least one of a rotation direction or a rotation angle of the field-of-view movement means 230 to move the first field-of-view. For example, the processor 220 may control the field-of-view movement means 230 (for example, a prism) to rotate around the z-axis in the clockwise direction by 0.05 degrees. For another example, the processor 220 may control the field-of-view movement means 230 to rotate around the z-axis by +0.01 degrees and around the y-axis by −0.03 degrees.

According to an embodiment, the first camera 131 may obtain an image corresponding to the first field-of-view moved by the field-of-view movement means 230. The first camera 131 may provide the image corresponding to the moved first field-of-view to the processor 220.

According to an embodiment, the first camera 131 and the field-of-view movement means 230 may be arranged as separate configurations. According to an embodiment, the first camera 131 and the field-of-view movement means 230 may be configured as single hardware module.

Figure 4:
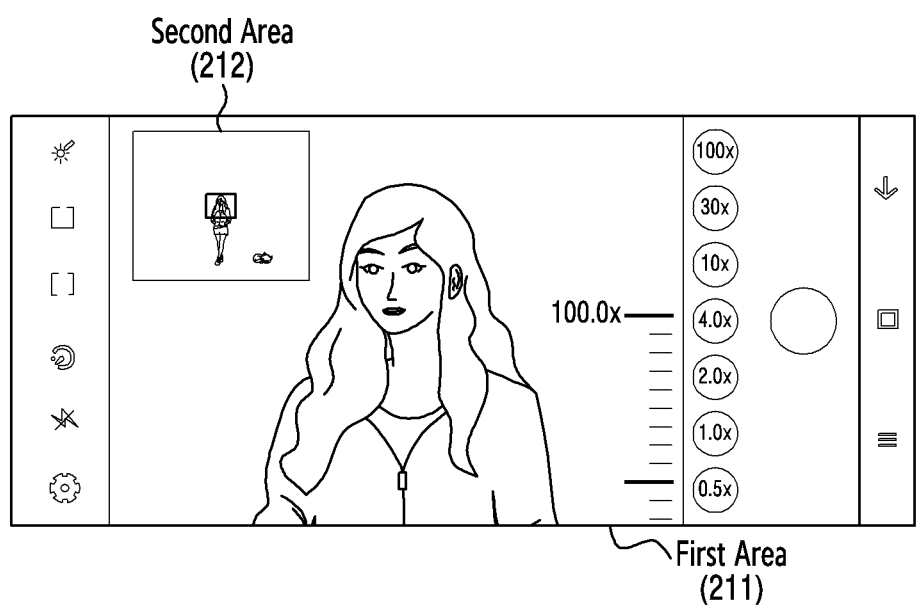
FIG. 4 illustrates an example of a first area and a second area of a display according to an embodiment of the disclosure.

FIG. 4 illustrates an example of a first area 211 and a second area 212 of a display 110 according to an embodiment of the disclosure.

Referring to FIG. 4, the display 110 may include a first area 211 and a second area 212. In an embodiment, the size of the second area 212 may be smaller than that of the first area 211. In an embodiment, the second area 212 may be understood as a zoom map.

In an embodiment, when the electronic device 100 operates a camera application, the processor 220 may display an execution screen of the camera application on the display 110. When the processor 220 display the camera application on the display 110, an area in which a preview image is displayed may be referred to as the first area 211. For example, a user may identify a preview image of a subject or a scene desired to be captured through the first area 211.

According to an embodiment, the processor 220 may display the second area 212 on the display 110 above a certain zoom magnification. For example, the processor 220 may not display the second area 212 at a first zoom magnification (for example, 1× zoom magnification), and display the second area 212 on the display 110 when a zoom input equal to or more than a second zoom magnification (for example, 20× zoom magnification) is obtained.

According to an embodiment, the processor 220 may display, on the second area 212, an image having a zoom magnification lower than that of an image displayed on the first area 211. For example, when set to 100× zoom magnification, the processor 220 may display a 100× zoom image on the first area 211 and a 4× zoom image on the second area 212. In an embodiment, the field of view of an image displayed on the second area 212 by the processor 220 may be wider than that of an image displayed on the first area 211.

According to an embodiment, the processor 220 may display, on the second area 212 of the display 110, a user interface (UI) indicating the field of view of the imaged displayed on the first area 211. For example, the processor 220 may display, in the second area 212, a rectangular user interface indicating the field of view of the preview image displayed on the first area 211. In an embodiment, a user may identify information related to the field of view of the preview image displayed on the first area 211 through a zoom map displayed on the second area 212 of the display 110. For example, a user may identify the position of the field of view of the preview image through the zoom map.

Although FIG. 4 illustrates that the second area 212 is located at a left upper end in the first area 211, the case is exemplary and the second area 212 may be displayed on various positions such as a right upper end, a left lower end, and a right lower end in the first area 211. In addition, although FIG. 4 illustrates that the second area 212 is surrounded by the first area 211, the case is exemplary and a portion of a boundary of the second area 212 may be shared by a boundary of the first area 211 or at least a portion of the second area 212 may be displayed to be positioned outside the first area 211.

Figure 5:
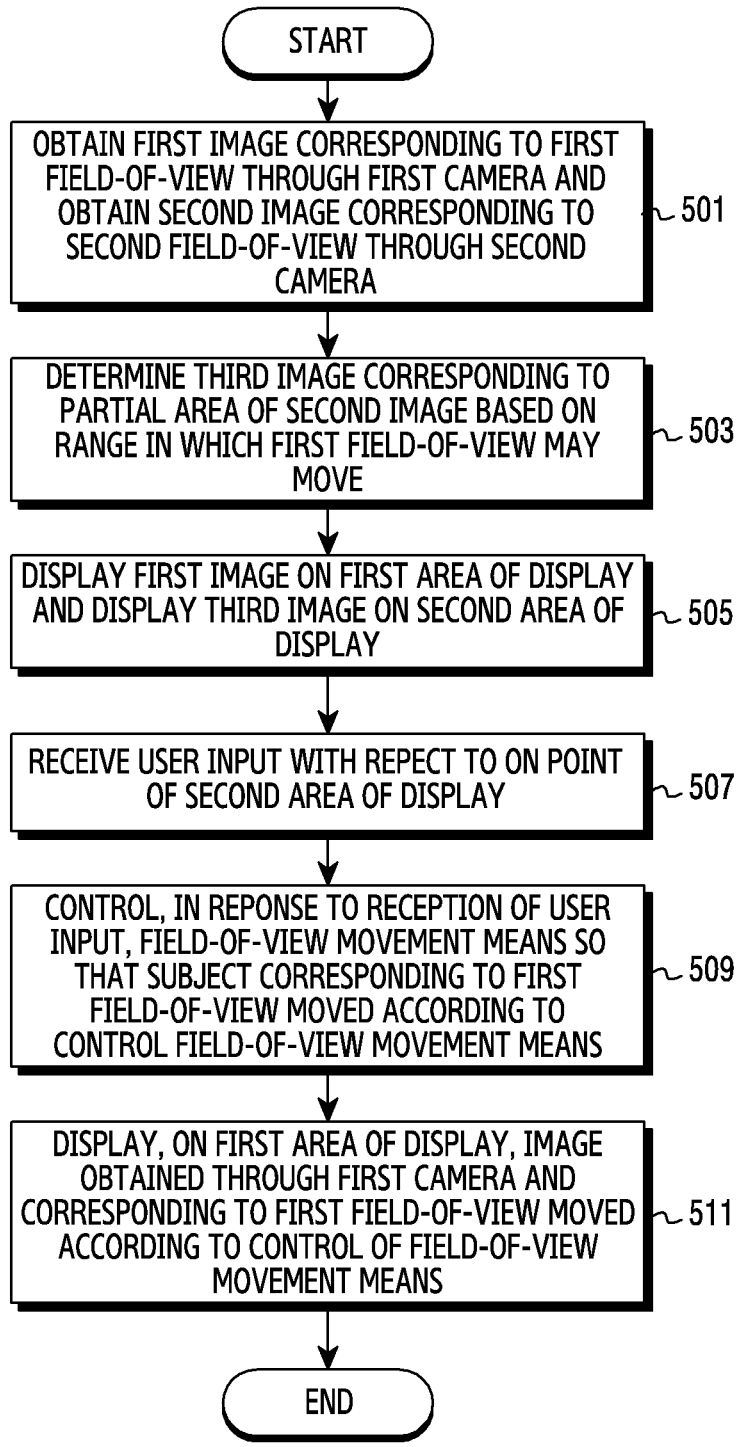
FIG. 5 is a flowchart illustrating an operation of a processor according to an embodiment of the disclosure.

FIG. 5 is a flowchart illustrating an operation of a processor 220 according to an embodiment of the disclosure.

Referring to FIG. 5, in operation 501, the processor 220 may obtain a first image corresponding to the first field-of-view through the first camera 131 and obtain a second image corresponding to the second field-of-view through the second camera 132.

According to an embodiment, in operation 503, the processor 220 may determine a third image corresponding to a partial area of the second image based on a range in which the first field-of-view may move.

According to an embodiment, the processor 220 may determine a partial area of the second image as the third image. For example, the processor 220 may determine, as the third image, an area within the second image, included in a range in which the first field-of-view may be moved. The range in which the first field-of-view may be moved may be included in the second field-of-view, and the third image may correspond to at least a partial area of a range in which the first field-of-view may be moved. In an embodiment, the processor 220 may determine an entire range in which the first field-of-view may be moved within the second image as the third image, and in another embodiment, the processor 220 may determine a portion of a range in which the first field-of-view may be moved within the second image as the third image. The positional relationship of the third image and the second image will be described below with reference to FIG. 7.

According to an embodiment, in operation 505, the processor 220 may display the first image on the first area 211 of the display 110 and the third image on the second area 212 of the display 110. For example, the processor 220 may display the first image corresponding to the first field-of-view as a preview on the first area 211 of the display 110 and the third image corresponding to a partial area of the second image on the second area 212 of the display 110. For example, the processor 220 may display the third image having a wider field of view than the first field-of-view of the first image on the zoom map displayed on the second area 212 of the display 110.

According to an embodiment, in operation 507, the processor 220 may receive a user input with respect to one point of the second area 212 the display 110.

According to an embodiment, the user input may include a user's touch input. For example, the processor 220 may receive a user's touch input with respect to one point of the second area 212 of the display 110. According to an embodiment, the processor 220 may receive a user input for a subject not included in the first image within the third image displayed on the second area 212. For example, the processor 220 may receive a user input for a subject which is included in the third image but not included in the first image in the second area 212 of the display 110.

According to an embodiment, in operation 509, the processor 220 may control, in response to the reception of the user input, the field-of-view movement means 230 so that the subject corresponding to the one point of the second area 212 is located within the first field-of-view.

According to an embodiment, the processor 220 may move the field-of-view of the first camera 131 in response to the reception of the user input. For example, the processor 220 may control the field-of-view movement means 230 to move the first field-of-view.

According to an embodiment, the field-of-view movement means 230 may be a prism. In response to the reception of a user input, the processor 220 may control a prism so that the subject corresponding to the user input may be located within the first field-of-view. For example, the processor 220 may control at least one of a rotation direction or a rotation angle of the prism to move the first field-of-view.

According to an embodiment, when the processor 220 receives a user input regarding a subject included in the third image but not included in first image, the processor 220 may control the field-of-view movement means 230 so that the subject is located within the first field-of-view. For example, the processor 220 may obtain information (for example, coordinate information) related to the position of the subject in the third image and control the field-of-view movement means 230 based on the information so as to move the first field-of-view.

According to an embodiment, the processor 220 may obtain coordinate information related to the movement of the first field-of-view in response to the reception of a user input. For example, processor 220 may obtain coordinate information related to the movement of the first field-of-view in order to control the field-of-view movement means 230. The processor 220 may control the field-of-view movement means 230 based on the coordinate information. For example, the coordinate information may include first coordinate information related to the second field-of-view, second coordinate information related to the first field-of-view, and third coordinate information related to distortion of an image.

According to an embodiment, the processor 220 may obtain first coordinate information corresponding to the one point at which a user input is received in the second field-of-view of the second camera 132. For example, the processor 220 may receive a user input with respect to the one point of the second area 212 of the display 110 and obtain first coordinate information regarding coordinates at which an image area corresponding to the one point is located within the second field-of-view of the second camera 132.

According to an embodiment, the processor 220 may convert the first coordinate information into a coordinate system corresponding to the first field-of-view of the first camera 131 to obtain the second coordinate information. For example, the first camera 131 and the second camera 132 are cameras having different fields of view, and thus the first field-of-view and the second field-of-view may be expressed in different coordinate systems. The first coordinate information and the second coordinate information will be described below with reference to FIG. 9A.

According to an embodiment, the processor 220 may obtain third coordinate information in which keystone distortion caused according to control of the field-of-view movement means 230 based on the second coordinate information is corrected. In an embodiment, the keystone distortion may be caused when the processor 220 controls the field-of-view movement means 230 (for example, a prism) to rotate so as to move the first field-of-view. For example, when the processor 220 rotates the field-of-view movement means 230, an image obtained through the first camera 131 may include a rotation component in a yaw direction. According to an embodiment, the processor 220 may obtain third coordinate information in order to prevent the first field-of-view from not being moved to an intended position due to the keystone distortion even when the field-of-view movement means 230 is controlled. For example, the processor 220 may obtain the third coordinate information in which the keystone distortion is corrected in order to prevent a subject corresponding to one point at which a user input is received from not being located within the moved first field-of-view. For example, processor 220 may obtain the third coordinate information considering the keystone distortion which may be caused by moving the first field-of-view according to control of the field-of-view movement means 230. According to an embodiment, the third coordinate information may have a form of (x", y"). The processor 220 may obtain the third coordinate information of p(x', y')=(x", y") by correcting the keystone distortion, based on the second coordinate information (x', y'). For example, the function p(x, y) may mean a correction function for correcting the keystone distortion. For example, the function p(x, y) may be a calibration table or a calibration matrix preinstalled in the electronic device 100.

According to an embodiment, in response to the reception of a user input with respect to one point of the second area 212 of the display 110, the processor 220 may sequentially obtain the first coordinate information, the second coordinate information, and the third coordinate information, and control the field-of-view movement means 230 based on the third coordinate information. According to another embodiment, the processor 220 may obtain partial information of the first coordinate information, the second coordinate information, and the third coordinate information, and control the field-of-view movement means 230 based on the obtained information.

According to an embodiment, the first camera 131 may obtain an image corresponding to the first field-of-view moved according to control of the field-of-view movement means 230. The first camera 131 may provide the image corresponding to the moved first field-of-view to the processor 220.

According to an embodiment, in operation 511, the processor 220 may display, on the first area 211 of the display 110, an image corresponding to the first field-of-view moved according to control of the field-of-view movement means 230 and obtained through the first camera 131.

According to an embodiment, the processor 220 may obtain an image corresponding to the moved first field-of-view from the first camera 131. According to an embodiment, the processor 220 may display the image corresponding to the moved first field-of-view on the first area 211 of the display 110 as a preview. According to an embodiment, the image corresponding to the moved first field-of-view may include a subject corresponding to one point at which a user input is received. For example, the processor 220 may receive a user input of touching a specific subject in the third image displayed on the second area 212. The processor 220 may move the first field-of-view so that the first field-of-view includes the specific subject. The processor 220 may obtain an image including the specific subject from the first camera 131.

According to an embodiment, the processor 220 may determine a fourth image corresponding to a partial area of the second image based on the moved first field-of-view. For example, the processor 220 may determine an area other than the area corresponding to the third image within the second image as the fourth image. According to an embodiment, the processor 220 may determine a partial area of the second image as a fourth image so that the moved first field-of-view is located within the fourth image. For example, the processor 220 may determine a partial area of the second image as a fourth image so that the subject corresponding to one point at which a user input is received is located at the center of the fourth image.

According to an embodiment, the processor 220 may determine partial areas of the second image as a third image and a fourth image, respectively so that the third image and the fourth image have the same size. According to another embodiment, the processor 220 may determine partial areas of the second image as a third image and a fourth image, respectively so that the third image and the fourth image have different sizes. For example, the processor 220 may determine the fourth image so that an area corresponding to the fourth image within the second image is included in an area corresponding to the third image.

According to an embodiment, the processor 220 may determine a partial area of the second image as a fourth image based on a range in which the first field-of-view may move. For example, the processor 220 may determine a fourth image so that the fourth image is included in a range in which the first field-of-view may be moved in the second image. The fourth image will be described below with reference to FIG. 8.

According to an embodiment, the processor 220 may display the fourth image on the second area 212 of the display 110. For example, the processor 220 may display an image corresponding to the moved first field-of-view as a preview on the first area 211 of the display 110 and the fourth image on the second area 212 of the display 110.

Figure 6:
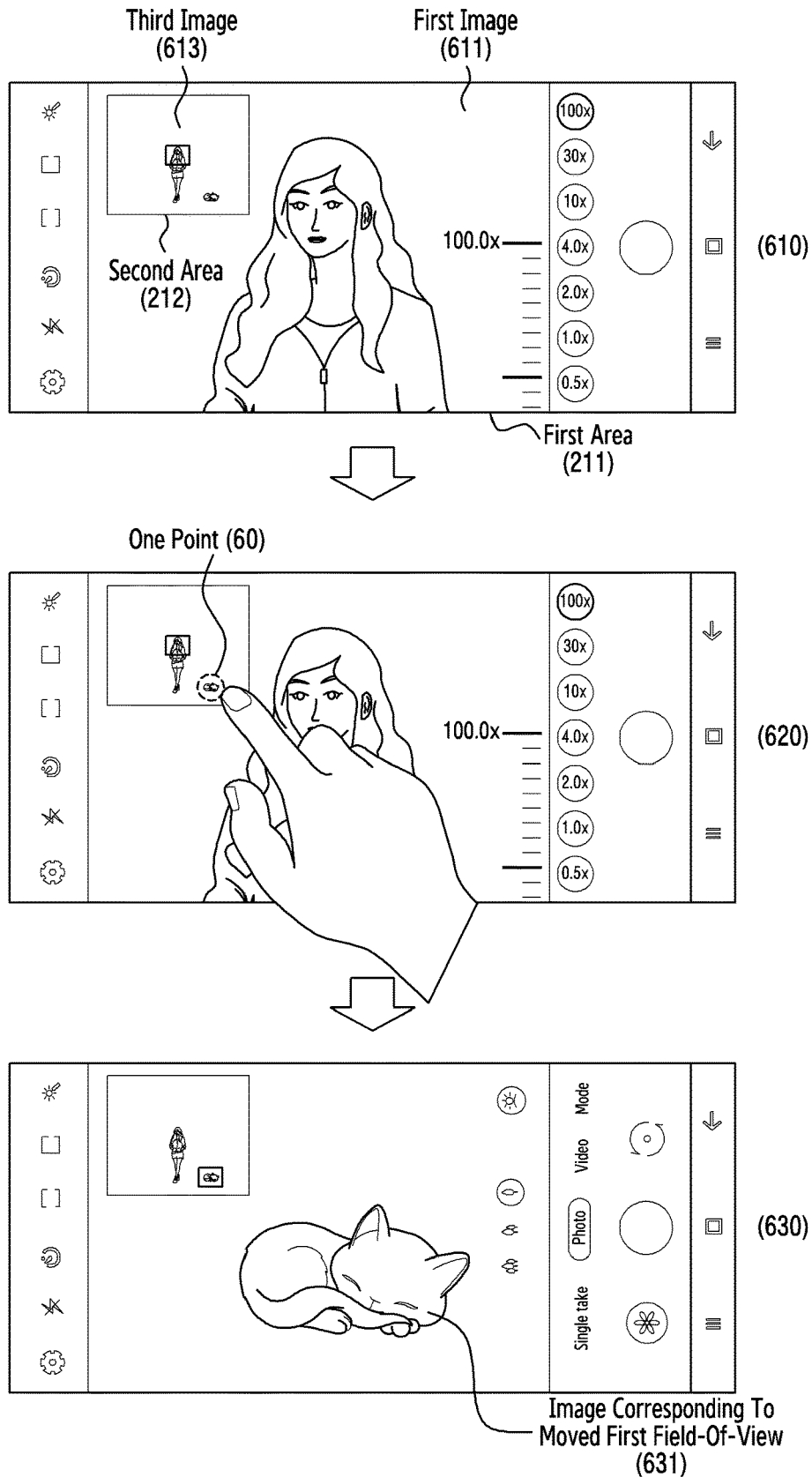
FIG. 6 illustrates an example of a user input and an image displayed on a display according to an embodiment of the disclosure.

FIG. 6 illustrates an example of a user input and an image displayed on a display 110 according to an embodiment of the disclosure.

Referring to FIG. 6, reference number 610, reference number 620, and reference number 630 illustrates embodiments of a camera application execution screen displayed on the display 110 by the processor 220.

According to an embodiment, in reference number 610, the processor 220 may display the first image 611 on the first area 211 of the display 110 and the third image 613 on the second area 212 of the display 110. In an embodiment, the magnification of the third image 613 may be smaller than that of the first image 611, and the field of view of the third image 613 may be wider than that of the first image 611. For example, a subject included in the first image 611 is included in the third image 613, a portion of a subject included in the third image 613 may not be included in the first image 611.

According to an embodiment, in reference number 620, the processor 220 may receive a user input with respect to one point 60 of the second area 212 the display 110. For example, the user may touch the one point 60 of the second area 212 of the display 110, and the processor 220 may receive the user's touch input with respect to the one point 60. In an embodiment, the processor 220 may receive a user input with respect to the one point 60 corresponding to a subject and not included in the first image 611 but included in the third image 613. For example, a user may touch the one point 60 to obtain an image of a specific subject within the third image 613 displayed on the second area 212.

According to an embodiment, in reference number 630, the processor 220 may control the field-of-view movement means 230 to locate a subject corresponding to the one point 60 within the first field-of-view, obtain, from the first camera 131, an image 631 corresponding to the first field-of-view moved according to the control of the field-of-view movement means 230, and display the image 631 corresponding to the moved first field-of-view on the first area 211 of the display 110. According to an embodiment, when displaying the image 631 corresponding to the moved first field-of-view on the first area 211 of the display 110, the processor 220 may continuously display the third image 613 on the second area 212 of the display 110. According to another embodiment, while displaying the image 631 corresponding to the moved first field-of-view on the first area 211 of the display 110, the processor 220 may display the fourth image different from the third image 613 on the second area 212 of the display 110.

According to an embodiment, the electronic device 100 may move a field of view of an image (for example, the first image 611) which is being photographing. The electronic device 100 may obtain an image (for example, the image 631 corresponding to the moved first field-of-view) having a field of view different from that of a preview image (for example, the first image 611) even without moving the electronic device 100. A user may move the field of view (for example, the first field-of-view) of the preview image (for example, the first image 611) without moving the electronic device 100. For example, an electronic device according to a conventional art needs to be moved to obtain an image having a field of view different from that of a preview image within an image area displayed on a zoom map. When the electronic device moves in a high magnification environment, even a small movement of the electronic device may bring a big change in an image and thus the electronic device has a problem in that it is easy to obtain a shaken image. In addition, the field of view of the preview image is narrow, and thus the user may have difficulty moving the field of view to an intended position. According to various embodiments disclosed herein, a user may obtain an image (for example, the image 631 corresponding to the moved first field-of-view) having a field of view different from that of a preview image (for example, the first image 611) even without moving the electronic device 100. Accordingly, the electronic device 100 may reduce blurring included in an image, and have an advantage of being able to easily obtain an image having various fields of view.

Figure 7:
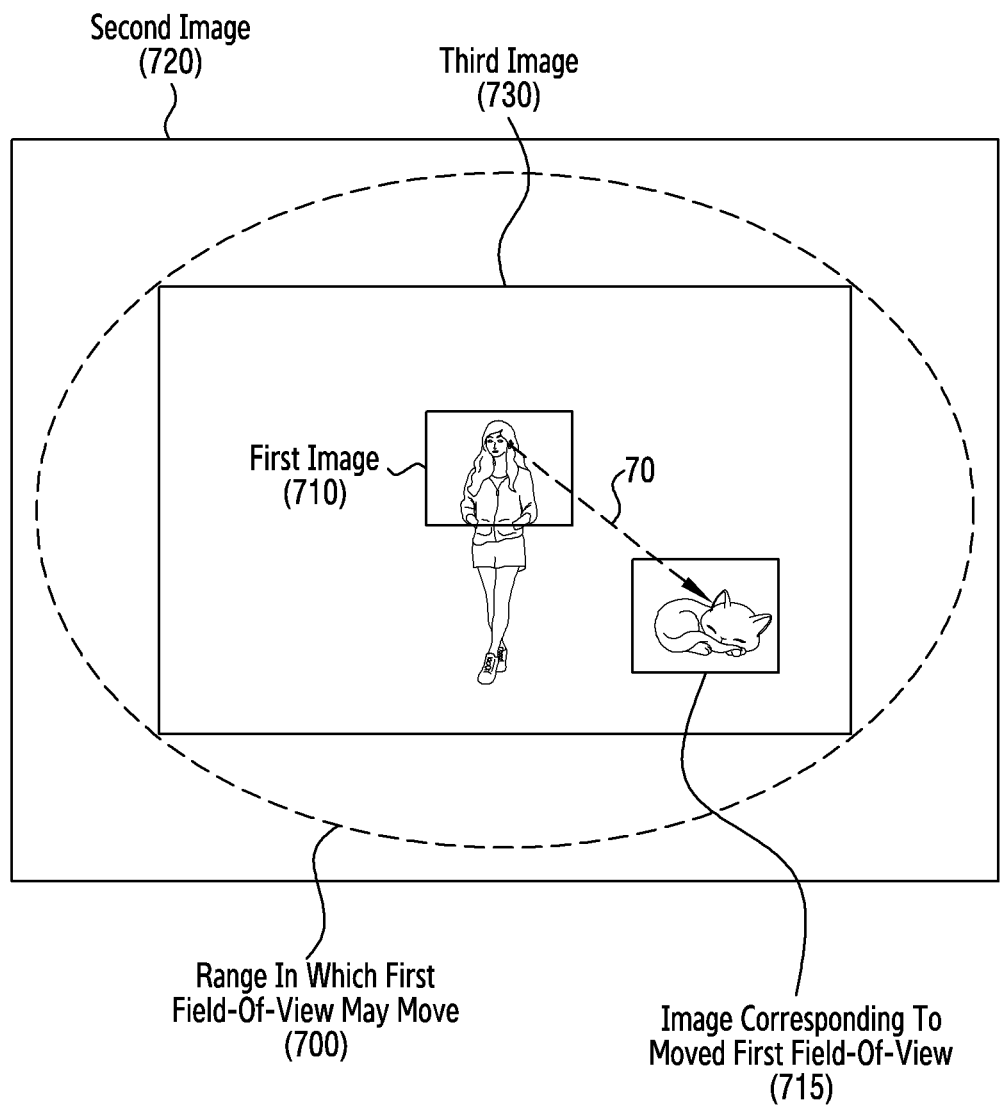
FIG. 7 illustrates an example of a first image, a second image, a third image, and an image corresponding to a moved first field-of-view according to an embodiment of the disclosure.

FIG. 7 illustrates an example of a first image 710, a second image 720, a third image 730, and an image 715 corresponding to a moved first field-of-view according to an embodiment of the disclosure.

Referring to FIG. 7, the processor 220 may obtain the first image 710 corresponding to the first field-of-view from the first camera 131 and the second image 720 corresponding to the second field-of-view wider than the first field-of-view from the second camera 132. Although the first image 710 and the second image 720 are separate images obtained through different cameras, FIG. 7 illustrates areas corresponding to each image with respect to scenes being photographed by the electronic device 100. For example, referring to FIG. 7, the scene corresponding to the first image 710 with respect to arbitrary scenes may be included in the scene corresponding to the second image 720.

According to an embodiment, the processor 220 may control the field-of-view movement means 230 to move the first field-of-view. For example, the range 700 in which the first field-of-view may move may be included in the second field-of-view. According to an embodiment, the range 700 in which the first field-of-view may move may be a range determined by the first camera 131 and the field-of-view movement means 230. For example, the range 700 in which the first field-of-view may move may be determined by at least a portion of a focal length of the first camera 131, a field of view, a size of a camera module, or a rotatable angle range of the field-of-view movement means 230. FIG. 7 illustrates a range of a scene in an arbitrary scene being photographed by the electronic device 100, which may be included in the first field-of-view by controlling the field-of-view movement means 230 by the processor 220 as the range 700 in which the first field-of-view may move. FIG. 7 illustrates the range 700 in which the first field-of-view may move in a circle or oval shape, but the case is one embodiment and various shapes are possible. For example, the range 700 in which the first field-of-view may move may have a rectangular shape and compared to the second image 720, the range may be larger or smaller than that shown in FIG. 7.

According to an embodiment, the processor 220 may determine the third image 730 corresponding to a partial area of the second image 720. According to an embodiment, the processor 220 may determine the third image 730 based on the range 700 in which the first field-of-view may move. Referring to FIG. 7, the third image 730 may be included in the range 700 in which the first field-of-view may move of the second image 720. For example, the third image 730 may correspond to a partial area of the range 700 in which the first field-of-view may move.

According to an embodiment, in response to the reception of a user input with respect to one point (for example, the one point 60 in FIG. 6) of the display 110, the processor 220 may control the field-of-view movement means 230 and obtain an image 715 corresponding to the moved first field-of-view from the first camera 131. According to an embodiment, the image 715 corresponding to the moved first field-of-view may be an image of a scene moved by a direction and distance corresponding to reference number 70 compared to the first image 710 with respect to the scene being photographed by the electronic device 100. For example, the processor 220 may determine the specific direction and the specific distance according to a position of the one point (for example, the one point 60 in FIG. 6) at which a user input is received.

According to an embodiment, the processor 220 may receive a user input within the second area 212 of the display 110 and move the first field-of-view so that a subject corresponding to the one point at which the user input is received is located within the first field-of-view. For example, the processor 220 may control the field-of-view movement means so that the first field-of-view is moved to correspond to reference number 70. Therefore, the third image 730 displayed on the second area 212 of the display 110 by the processor 220 may not include a scene not included in the range 700 in which the first field-of-view may move. According to an embodiment, the processor 220 may determine the third image 730 based on the range 700 in which the first field-of-view may move in order to display, on the second area 212, an image included in the range 700 in which the first field-of-view may move. For example, the processor 220 may determine, as the third image 730, the entirety or a partial area of the range 700 in which the first field-of-view may move within the second image 720.

According to an embodiment, before moving the first field-of-view, the processor 220 may display the first image 710 on the first area 211 of the display 110 and display the third image 730 on the second area 212 of the display 110. According to an embodiment, after moving the first field-of-view, the processor 220 may display the image 715 corresponding to the moved first field-of-view on the first area 211 of the display 110, and continuously display the third image 730 on the second area 212 of the display 110 or display a fourth image different from the third image 730. The fourth image will be described below with reference to FIG. 8.

Figure 8:
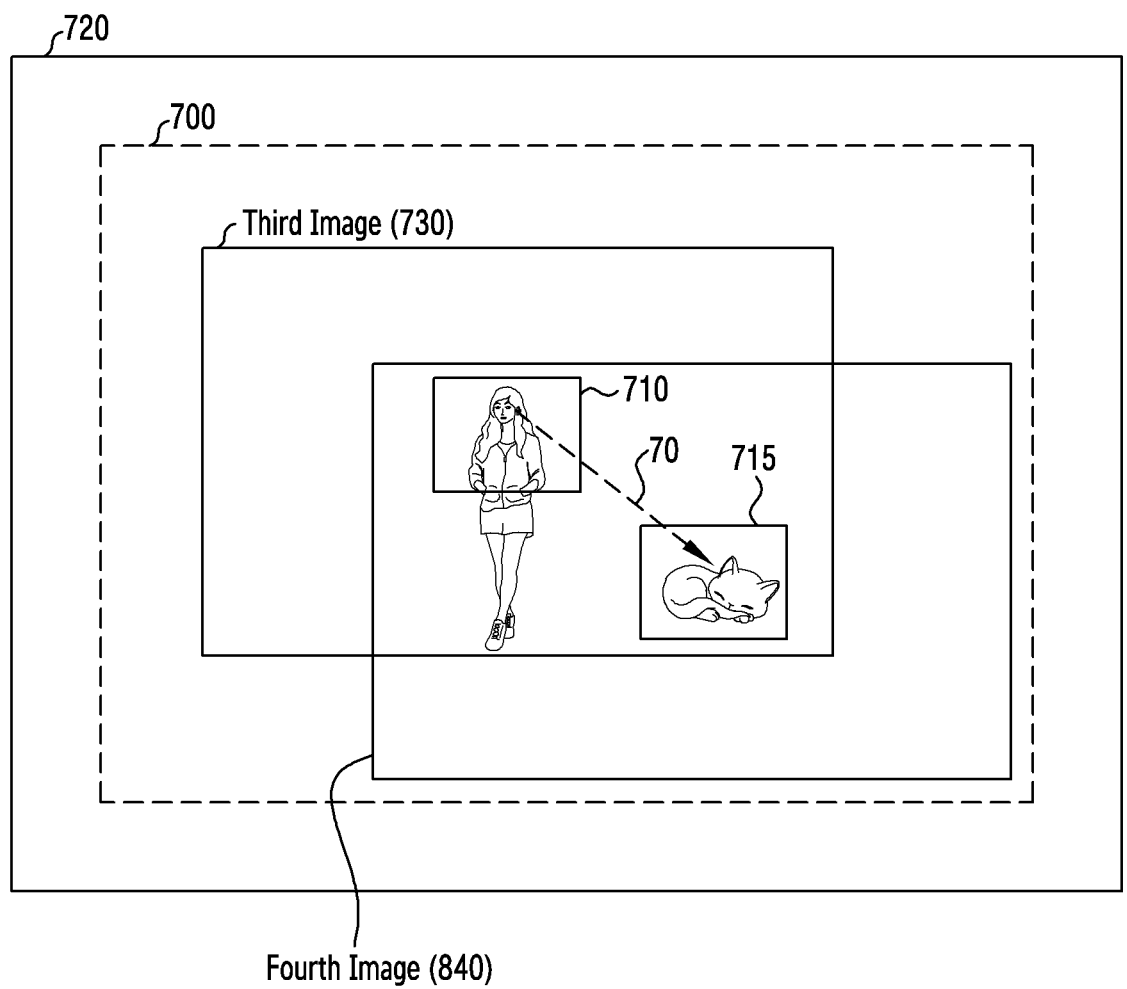
FIG. 8 illustrates an example of a fourth image according to an embodiment of the disclosure.

FIG. 8 illustrates an example of a fourth image 840 according to an embodiment of the disclosure.

Referring to FIG. 8, the first image 710, the second image 720, the third image 730, the range 700 in which the first field-of-view may move, and the image 715 corresponding to the moved first field-of-view may correspond to the configuration described with reference to FIG. 7. A description of the configuration illustrated in FIG. 7 among the configurations of FIG. 8 may be omitted. In an embodiment, unlike FIG. 7, FIG. 8 illustrates the range 700 in which the first field-of-view may move as a rectangular shape, but this is merely an embodiment and the range 700 in which the first field-of-view may move may have various shapes.

According to an embodiment, the processor 220 may determine the fourth image 840 corresponding to a partial area of the second image 720 based on the moved first field-of-view. The processor 220 may display the fourth image 840 on the second area 212 of the display 110. According to an embodiment, when displaying the image 715 corresponding to the moved first field-of-view on the first area 211 of the display 110, the processor 220 may display the third image 730 or the fourth image 840 on the second area 212 of the display 110.

According to an embodiment, the processor 220 may determine, as the fourth image 840, a partial area other than the area different from the third image 730 within the second image 720 based on the moved first field-of-view. According to an embodiment, the processor 220 may determine the fourth image 840 so that an area pertaining to the image 715 corresponding to the moved first field-of-view within the scene being photographed by the electronic device 100 is included in the fourth image 840. For example, the processor 220 may determine the fourth image 840 so that a subject included in the image 715 corresponding to the moved first field-of-view is located at the center of the fourth image 840.

According to an embodiment, the processor 220 may determine the fourth image 840 so that the fourth image 840 is included in the range 700 in which the first field-of-view may move. For example, the processor 220 may determine the third image 730 and the fourth image 840 so that both the third image 730 and the fourth image 840 are included in the range 700 in which the first field-of-view may move. According to an embodiment, the processor 220 may receive a second user input with respect to the second area 212 of the display 110 even after displaying the fourth image 840 and the image 715 corresponding to the moved first field-of-view on the display 110 in response to the reception of a first user input (for example, the user input described with reference to reference number 620 in FIG. 6). That is, the processor 220 may receive the second user input following the first user input. In response to the reception of the second user input, the processor 220 may control the field-of-view movement means 230 again to move the moved first field-of-view. Accordingly, the processor 220 may determine the fourth image 840 so that the fourth image 840 to be displayed on the second area 212 of the display 110 is included in the range 700 in which the first field-of-view may move.

According to an embodiment, the fourth image 840 may be a partial area of the second image 720, included in the range 700 in which the first field-of-view may move, and include the image 715 corresponding to the moved first field-of-view. FIG. 8 illustrates that a partial area of the fourth image 840 is included in the third image 730 and the rest area of the fourth image 840 is not included in the third image 730, but this is merely one embodiment and the third image 730 and the fourth image 840 may have various inclusion relations. For example, the processor 220 may determine the fourth image 840 so that the fourth image 840 is included in the third image 730 or determine the fourth image 840 so that the fourth image 840 includes the third image 730.

According to an embodiment, the processor 220 may detect movement of the electronic device 100 through the motion sensor 240 while the first field-of-view is moved. The processor 220 may obtain motion data corresponding to movement of the electronic device 100 from the motion sensor 240. For example, the processor 220 may obtain motion data corresponding to movement of the electronic device 100 through the motion sensor 240 while controlling the field-of-view movement means 230. According to an embodiment, the processor 220 may determine the fourth image 840 based on the motion data. For example, the processor 220 may perform video digital image stabilization (VDIS) with respect to each image data obtained through the first camera 131 and the second camera 132. According to an embodiment, the processor 220 may perform VDIS with respect to image data obtained through the first camera 131 based on the motion data while the first field-of-view is moved. In addition, the processor 220 may perform VDIS with respect to image data obtained through the second camera 132 based on the motion data while the first field-of-view is moved. According to an embodiment, the processor 220 may determine the fourth image 840 in consideration of the motion date and a motion correction value according to VDIS. When the motion date or the motion correction value according to VDIS are not considered, the processor 220 may determine the fourth image 840 unrelated to the image 715 corresponding to the moved first field-of-view. For example, at least a portion of the image 715 corresponding to the moved first field-of-view may be not included in the fourth image 840. Accordingly, the processor 220 may determine the fourth image 840 based on the motion date and the motion correction value according to VDIS obtained while the first field-of-view is moved.

Figure 9A:
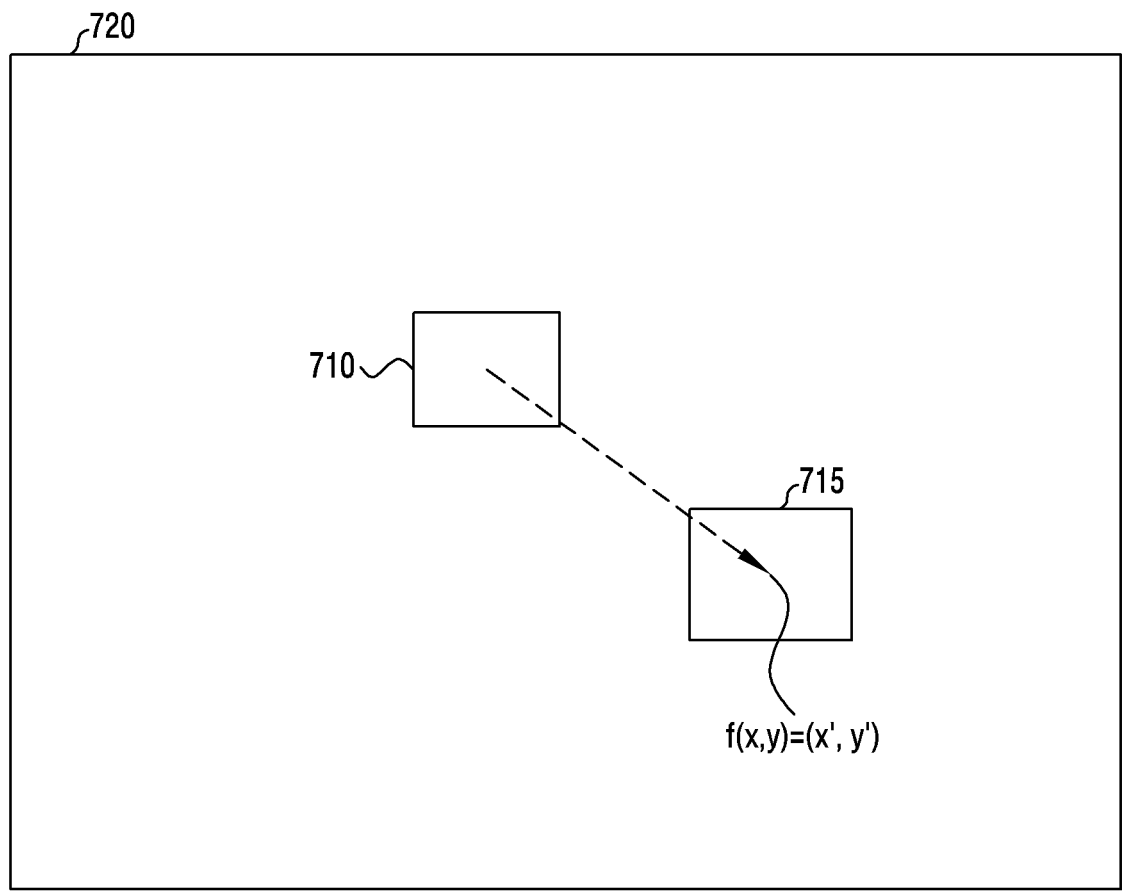
FIG. 9A illustrates an example of first coordinate information and second coordinate information according to an embodiment of the disclosure.

FIG. 9A illustrates an example of first coordinate information and second coordinate information according to an embodiment of the disclosure.

According to an embodiment, the processor 220 may obtain, in response to the reception of a user input, first coordinate information corresponding to the one point (for example, the one point 60 in FIG. 6) at which the user input is received within the second field-of-view of the second camera 132. For example, the processor 220 may receive a user input with respect to the one point of the second area 212 of the display 110 and obtain first coordinate information regarding coordinates of a position corresponding to the one point within the second field-of-view. According to an embodiment, the first coordinate information may have a form of (x, y). According to another embodiment, the first coordinate information may be displayed by using an appropriate coordinate system. For example, the first coordinate information may be expressed as a three-dimensional spherical coordinate system or a two-dimensional circular coordinate system. Referring to FIG. 9A, the processor 220 may obtain (x, y) that is first coordinate information corresponding to the one point within the second field-of-view corresponding to the second image 720.

According to an embodiment, the processor 220 may convert the first coordinate information into a coordinate system corresponding to the first field-of-view of the first camera 131 to obtain the second coordinate information. For example, the first camera 131 and the second camera 132 are different from each other, and thus the first field-of-view and the second field-of-view may be expressed in different coordinate systems. According to an embodiment, the processor 220 may use at least a portion of calibration information, a zoom value, and distance information for coordinate conversion between the first camera 131 and the second camera 132. Referring to FIG. 9A, the processor 220 may obtain (x', y') which is second coordinate information by converting the coordinates with respect to the first coordinate information (x, y). For example, the processor 220 may obtain the second coordinate information, f(x, y)=(x', y'), by applying a coordinate conversion function f with respect to the first coordinate information.

Figure 9B:
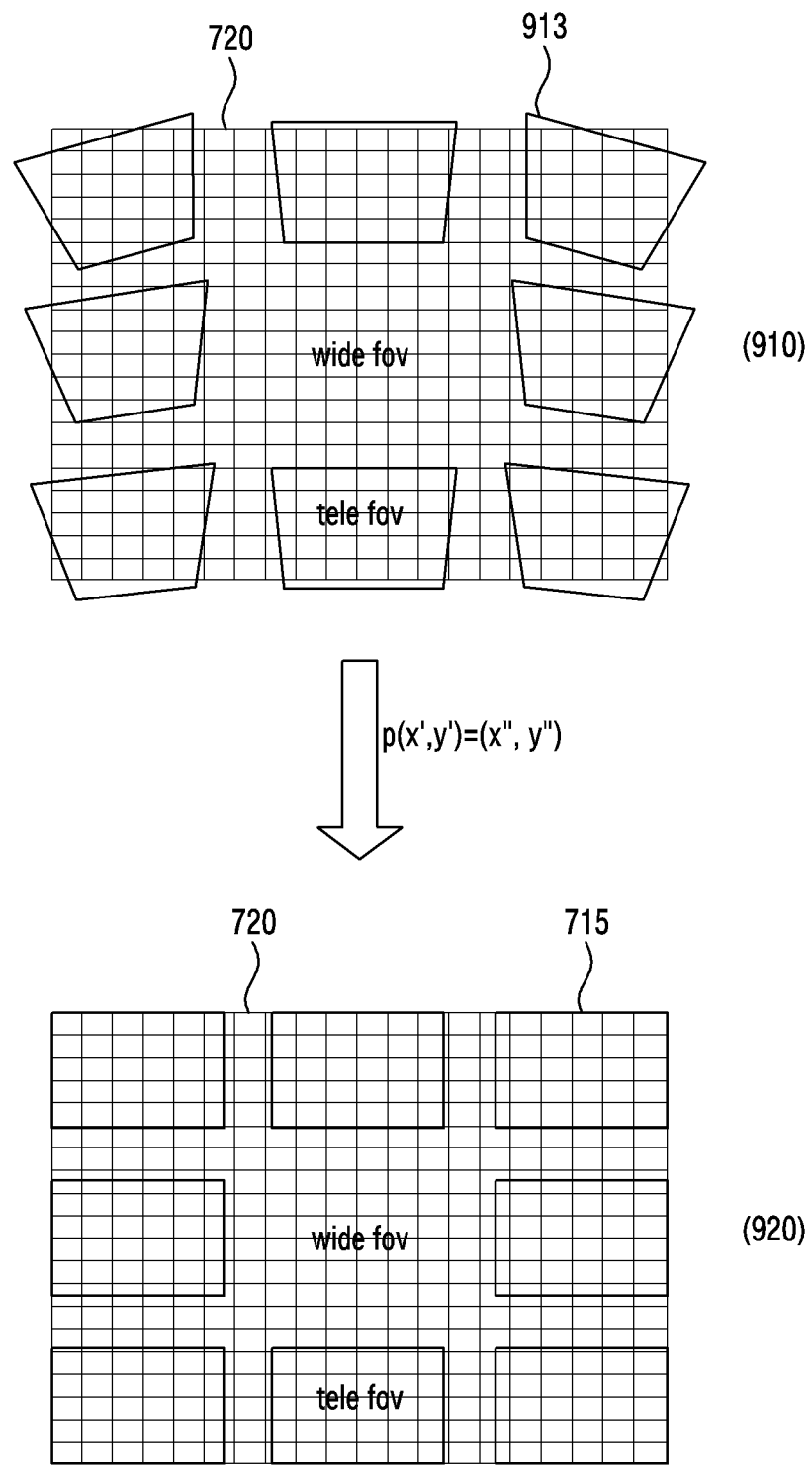
FIG. 9B illustrates an example of second coordinate information and third coordinate information according to an embodiment of the disclosure.

FIG. 9B illustrates an example of second coordinate information and third coordinate information according to an embodiment of the disclosure.

Referring to FIG. 9A, when the processor 220 moves the first field-of-view based on the second coordinate information described above, the processor 220 may obtain an image 913 from the first camera 131. According to an embodiment, the image 913 may include keystone distortion that may be caused by controlling the field-of-view movement means 230. For example, the image 913 may be an image including a rotation component in a yaw direction as the field-of-view movement means 230 rotates.

According to an embodiment, the processor 220 may obtain third coordinate information in which keystone distortion caused according to control of the field-of-view movement means 230 based on the second coordinate information is corrected. Referring to FIG. 9B, the processor 220 may obtain (x", y") which is third coordinate information by correcting keystone distortion with respect to the second coordinate information (x', y'). For example, the processor 220 may obtain the third coordinate information, p(x', y')= (x", y"), by applying a keystone distortion correction function p with respect to the second coordinate information.

Referring to FIG. 9B, reference number 910 illustrates an example of an image 913 in which keystone distortion is not corrected and reference number 920 illustrates an example of an image 715 in which keystone distortion is corrected. The image 715 in which keystone distortion is corrected may mean the image 715 corresponding to the moved first field-of-view shown in FIG. 7 to FIG. 8.

An electronic device according to an embodiment disclosed herein may include a first camera having a first field-of-view, a second camera having a second field-of-view wider than the first field-of-view, a field-of-view movement means configured to control a path of light incident to the first camera so as to move the first field-of-view, a display including a first area and a second area smaller than the first area, and at least one processor electrically connected to the first camera, the second camera, the field-of-view movement means, and the display. The at least one processor may obtain a first image corresponding to the first field-of-view through the first camera, obtain a second image corresponding to the second field-of-view through the second camera, determine a third image corresponding to a partial area of the second image based on a range in which the first field-of-view may move, display the first image on the first area of the display, display the third image on the second area of the display, receive a user input with respect to one point of the second area of the display, control, in response to the reception of the user input, the field-of-view movement means so that a subject corresponding to the one point of the second area is located within the first field-of-view, and display, on the first area of the display, an image obtained through the first camera and corresponding to a first field-of-view moved according to control of the field-of-view movement means.

In the electronic device according to an embodiment disclosed herein, the at least one processor may determine a fourth image corresponding to a partial area of the second image based on the moved first field-of-view and display the fourth image on the second area of the display.

The electronic device according to an embodiment disclosed herein may further include a motion sensor electrically connected to the at least one processor. The at least one processor may obtain, through the motion sensor, motion data corresponding to the movement of the electronic device caused while the first field-of-view is moved and determine the fourth image based on the motion data.

In the electronic device according to an embodiment disclosed herein, the user input may include a touch input with respect to the one point of the second area of the display.

In the electronic device according to an embodiment disclosed herein, the field-of-view movement means is a prism and the at least one processor may control at least one of a rotation direction or a rotation angle of the prism and obtain an image corresponding to the moved first field-of-view through the first camera.

In the electronic device according to an embodiment disclosed herein, the at least one processor may obtain, in response to the reception of the user input, coordinate information related to the movement of the first field-of-view and control the field-of-view movement means based on the coordinate information.

In the electronic device according to an embodiment disclosed herein, the coordinate information may include first coordinate information and second coordinate information and the at least one processor may obtain the first coordinate information corresponding to the one point at which the user input is received within the second field-of-view of the second camera and obtain the second coordinate information by converting the first coordinate information into a coordinate system corresponding to the first field-of-view of the first camera.

In the electronic device according to an embodiment disclosed herein, the coordinate information may further include third coordinate information and the at least one processor may obtain the third coordinate information in which keystone distortion that may be caused by controlling the field-of-view movement means based on the second coordinate information is corrected and control the field-of-view movement means based on the third coordinate information.

An operating method of an electronic device according to an embodiment disclosed herein may include an operation of obtaining a first image corresponding to a first field-of-view through a first camera included in the electronic device, an operation of obtaining a second image corresponding to a second field-of-view wider than the first field-of-view through a second camera included in the electronic device, an operation of determining a third image corresponding to a partial area of the second image based on a range in which the first field-of-view may move by controlling a path of light incident to the first camera through a field-of-view movement means included in the electronic device, an operation of displaying the first image on a first area of a display included in the electronic device, an operation of displaying the third image on a second area smaller than the first area of the display, an operation of receiving a user input with respect to one point of the second area of the display, an operation of controlling, in response to the reception of the user input, the field-of-view movement means so that a subject corresponding to the one point of the second area is located within the first field-of-view, and an operation of displaying, on the first area of the display, an image obtained through the first camera and corresponding to a first field-of-view moved according to control of the field-of-view movement means.

The operating method of an electronic device according to an embodiment disclosed herein may further include an operation of determining a fourth image corresponding to a partial area of the second image based on the moved first field-of-view and an operation of displaying the fourth image on the second area of the display.

In the operating method of an electronic device according to an embodiment disclosed herein, the operation of determining the fourth image may include an operation of obtaining, through a motion sensor included in the electronic device, motion data corresponding to the movement of the electronic device caused while the first field-of-view is moved and an operation of determining the fourth image based on the motion data.

In the operating method of an electronic device according to an embodiment disclosed herein, the field-of-view movement means is a prism and the operation of controlling the field-of-view movement means may include an operation of controlling at least one of a rotation direction or a rotation angle of the prism.

In the operating method of an electronic device according to an embodiment disclosed herein, the operation of controlling the field-of-view movement means may include an operation of obtaining, in response to the reception of the user input, coordinate information related to the movement of the first field-of-view and an operation of controlling the field-of-view movement means based on the coordinate information.

In the operating method of an electronic device according to an embodiment disclosed herein, the operation of obtaining the coordinate information may include an operation of obtaining first coordinate information corresponding to the one point at which the user input is received within the second field-of-view of the second camera and an operation of obtaining second coordinate information by converting the first coordinate information into a coordinate system corresponding to the first field-of-view of the first camera.

In the operating method of an electronic device according to an embodiment disclosed herein, the operation of obtaining the coordinate information may include an operation of obtaining third coordinate information in which keystone distortion that may be caused by controlling the field-of-view movement means based on the second coordinate information is corrected.

An electronic device according to an embodiment disclosed herein may include a first camera having a first field-of-view, a second camera having a second field-of-view wider than the first field-of-view, a field-of-view movement means configured to control a path of light incident to the first camera so as to move the first field-of-view, a display including a first area and a second area smaller than the first area, and at least one processor electrically connected to the first camera, the second camera, the field-of-view movement means, and the display. The at least one processor may obtain a first image corresponding to the first field-of-view through the first camera, obtain a second image corresponding to the second field-of-view through the second camera, determine a third image corresponding to a partial area of the second image based on a range in which the first field-of-view may move, display the first image on the first area of the display, display the third image on the second area of the display, receive a user input with respect to one point of the second area of the display, control, in response to the reception of the user input, the field-of-view movement means so that a subject corresponding to the one point of the second area is located within the first field-of-view, display, on the first area of the display, an image obtained through the first camera and corresponding to a first field-of-view moved according to control of the field-of-view movement means, determine a fourth image corresponding to a partial area of the second image based on the moved first field-of-view, and display the fourth image on the second area of the display.

In the electronic device according to an embodiment disclosed herein, the at least one processor may determine at least a portion of a range in which the first field-of-view may move as the third image.

In the electronic device according to an embodiment disclosed herein, the at least one processor may determine at least a portion of a range in which the first field-of-view may move as the fourth image.

In the electronic device according to an embodiment disclosed herein, the at least one processor may determine the fourth image so that the moved first field-of-view is located at the center of the fourth image.

In the electronic device according to an embodiment disclosed herein, the at least one processor may display the third image on the second area of the display based on a magnification configured to be equal to or more than a designated magnification.

Figure 10:
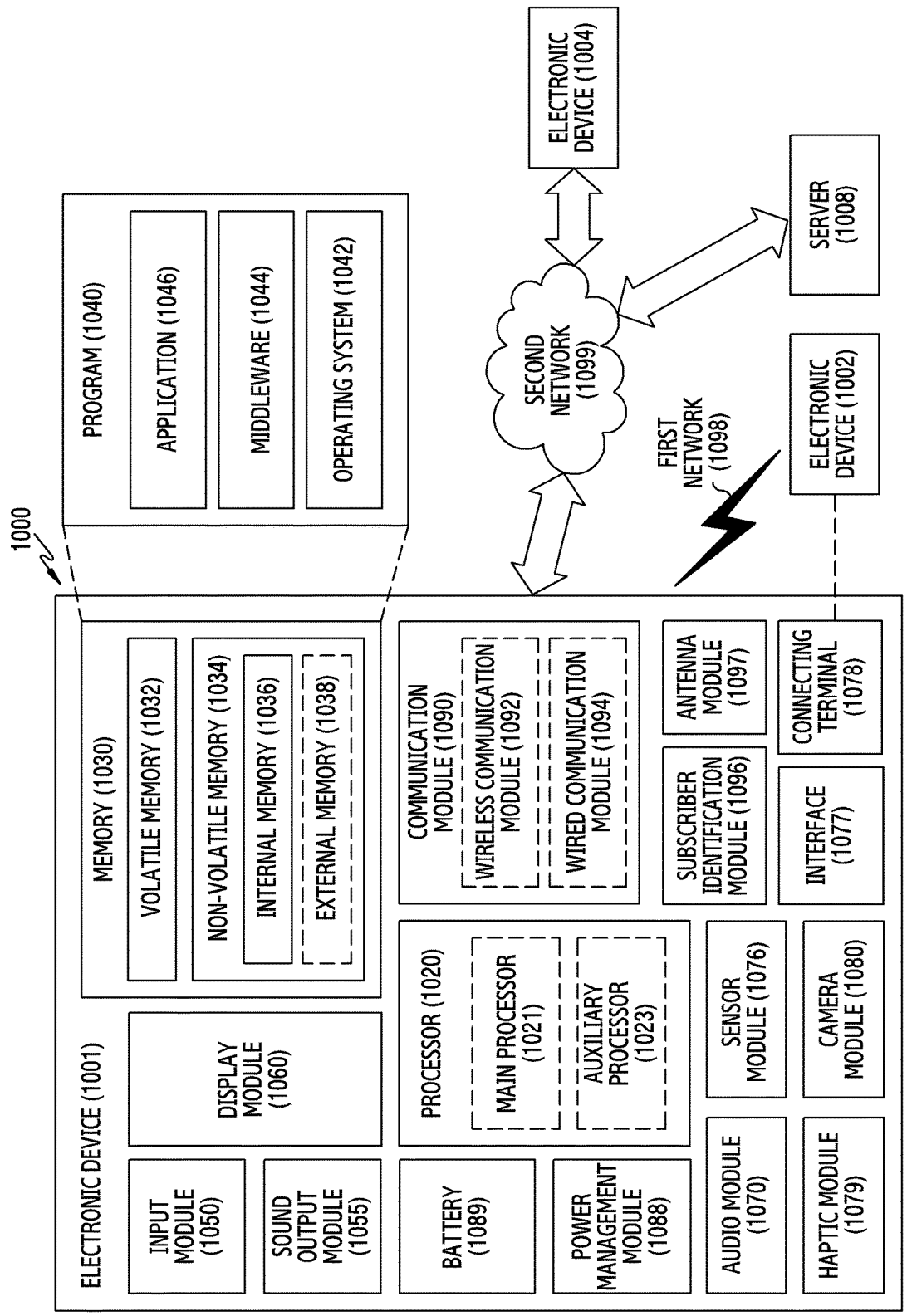
FIG. 10 is a block diagram illustrating an electronic device in a network environment according to an embodiment of the disclosure.

FIG. 10 is a block diagram illustrating an electronic device 1001 in a network environment 1000 according to an embodiment of the disclosure.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the SIM 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the electronic devices 1002 or 1004, or the server 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 11:
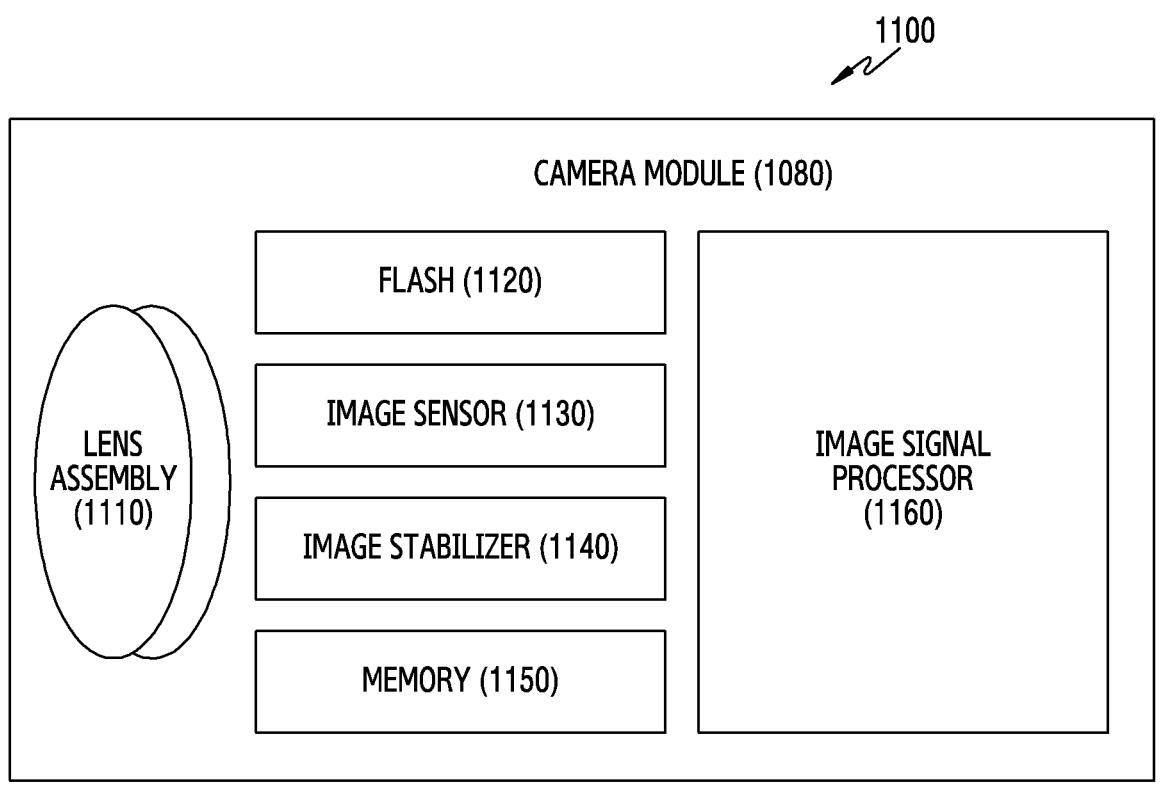
FIG. 11 is a block diagram illustrating a camera according to an embodiment of the disclosure.

FIG. 11 is a block diagram 1100 illustrating the camera module 1080 according to an embodiment of the disclosure.

Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display module 1060. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display module 1060, the electronic device 1002, the electronic device 1004, or the server 1008) outside the camera module 1080. According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display module 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera Similarly, at least one of the plurality of camera modules 1080 may form, for example, a front camera and at least another of the plurality of camera modules 1080 may form a rear camera.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first camera having a first field-of-view;
   a second camera having a second field-of-view wider than the first field-of-view;
   a field-of-view movement optical element configured to control a path of light incident to the first camera so as to move the first field-of-view;
   a display comprising a first area and a second area smaller than the first area;

memory, comprising one or more storage media, storing instructions; and one or more processors electrically connected to the first camera, the second camera, the field-of-view movement optical element, the display, and the memory, wherein the instructions, when executed by the one or more processors individually or collectively, cause the electronic device to:

obtain a first image corresponding to the first field-of-view through the first camera, obtain a second image corresponding to the second field-of-view through the second camera, determine a third image corresponding to a partial area of the second image based on a range in which the first field-of-view is movable, display the first image on the first area of the display, display the third image on the second area of the display, while the electronic device is not moving, receive a user input with respect to one point of the second area of the display, control, in response to the user input, the field-of-view movement optical element so that a subject corresponding to the one point of the second area is located within the first field-of-view, and display, on the first area of the display, an image obtained through the first camera and corresponding to a movement of the first field-of-view according to the control of the field-of-view movement optical element.

2. The electronic device of claim 1, wherein the instructions, when executed by the one or more processors individually or collectively, further cause the electronic device to:

determine a fourth image corresponding to a partial area of the second image based on the moved first field-of-view, and display the fourth image on the second area of the display.

3. The electronic device of claim 2, further comprising:

a motion sensor electrically connected to the one or more processors, wherein the instructions, when executed by the one or more processors individually or collectively, further cause the electronic device to:

obtain, through the motion sensor, motion data corresponding to a movement of the electronic device while the first field-of-view is moved, and determine the fourth image based on the motion data.

4. The electronic device of claim 1, wherein the user input comprises a touch input with respect to the one point of the second area of the display.

5. The electronic device of claim 1, wherein the field-of-view movement optical element is a prism, and wherein the instructions, when executed by the one or more processors individually or collectively, further cause the electronic device to:

control at least one of a rotation direction or a rotation angle of the prism, and obtain an image corresponding to the moved first field-of-view through the first camera.

6. The electronic device of claim 1, wherein the instructions, when executed by the one or more processors individually or collectively, further cause the electronic device to:

obtain, in response to the user input, coordinate information related to the movement of the first field-of-view, and control the field-of-view movement optical element based on the coordinate information.

7. The electronic device of claim 6, wherein the coordinate information comprises first coordinate information and second coordinate information, and wherein the instructions, when executed by the one or more processors individually or collectively, further cause the electronic device to:

obtain the first coordinate information corresponding to the one point at which the user input is received within the second field-of-view of the second camera, and obtain the second coordinate information by converting the first coordinate information into a coordinate system corresponding to the first field-of-view of the first camera.

8. The electronic device of claim 7, wherein the coordinate information further comprises third coordinate information, and wherein the instructions, when executed by the one or more processors individually or collectively, further cause the electronic device to:

obtain the third coordinate information in which keystone distortion caused by controlling the field-of-view movement optical element based on the second coordinate information is corrected, and control the field-of-view movement optical element based on the third coordinate information.

9. A method performed by an electronic device, the method comprising:

obtaining a first image corresponding to a first field-of-view through a first camera included in the electronic device;

obtaining a second image corresponding to a second field-of-view wider than the first field-of-view through a second camera included in the electronic device;

determining a third image corresponding to a partial area of the second image based on a range in which the first field-of-view is movable by controlling a path of light incident to the first camera through a field-of-view movement optical element included in the electronic device;

displaying the first image on a first area of a display included in the electronic device;

displaying the third image on a second area smaller than the first area of the display;

while the electronic device is not moving, receiving a user input with respect to one point of the second area of the display;

controlling, in response to the user input, the field-of-view movement optical element so that a subject corresponding to the one point of the second area is located within the first field-of-view; and displaying, on the first area of the display, an image obtained through the first camera and corresponding to a movement of the first field-of-view according to the controlling of the field-of-view movement optical element.

10. The method of claim 9, further comprising:

determining a fourth image corresponding to a partial area of the second image based on the moved first field-of-view; and displaying the fourth image on the second area of the display.

11. The method of claim 10,
wherein the determining of the fourth image comprises:
   obtaining, through a motion sensor of the electronic device, motion data corresponding to a movement of the electronic device while the first field-of-view is moved; and
   determining the fourth image based on the motion data.

12. The method of claim 9,
wherein the field-of-view movement optical element is a prism, and
wherein the controlling of the field-of-view movement optical element comprises:
   controlling at least one of a rotation direction or a rotation angle of the prism, and
   obtaining an image corresponding to the moved first field-of-view through the first camera.

13. The method of claim 9, wherein the controlling of the field-of-view movement optical element comprises:
   obtaining, in response to the user input, coordinate information related to the movement of the first field-of-view; and
   controlling the field-of-view movement optical element based on the coordinate information.

14. The method of claim 13, wherein the obtaining the coordinate information comprises:
   obtaining first coordinate information corresponding to the one point at which the user input is received within the second field-of-view of the second camera; and
   obtaining second coordinate information by converting the first coordinate information into a coordinate system corresponding to the first field-of-view of the first camera.

15. The method of claim 14, wherein the obtaining the coordinate information further comprises:
   obtaining third coordinate information in which keystone distortion caused by controlling the field-of-view movement optical element based on the second coordinate information is corrected; and
   controlling the field-of-view movement optical element based on the third coordinate information.

16. An electronic device comprising:
   a first camera having a first field-of-view;
   a second camera having a second field-of-view wider than the first field-of-view;
   a field-of-view movement optical element configured to control a path of light incident to the first camera so as to move the first field-of-view;
   a display comprising a first area and a second area smaller than the first area;
   memory, comprising one or more storage media, storing instructions; and
   one or more processors electrically connected to the first camera, the second camera, the field-of-view movement optical element, the display, and the memory,
   wherein the instructions, when executed by the one or more processors individually or collectively, cause the electronic device to:
      obtain a first image corresponding to the first field-of-view through the first camera,
      obtain a second image corresponding to the second field-of-view through the second camera,
      determine a third image corresponding to a partial area of the second image based on a range in which the first field-of-view is movable,
      display the first image on the first area of the display,
      display the third image on the second area of the display,
      while the electronic device is not moving, receive a user input with respect to one point of the second area of the display,
      control, in response to the user input, the field-of-view movement optical element so that a subject corresponding to the one point of the second area is located within the first field-of-view,
      display, on the first area of the display, an image obtained through the first camera and corresponding to a movement of the first field-of-view according to the control of the field-of-view movement optical element,
      determine a fourth image corresponding to a partial area of the second image based on the moved first field-of-view, and
      display the fourth image on the second area of the display.

17. The electronic device of claim 16, wherein the instructions, when executed by the one or more processors individually or collectively, further cause the electronic device to determine at least a portion of a range in which the first field-of-view is movable as the third image.

18. The electronic device of claim 16, wherein the instructions, when executed by the one or more processors individually or collectively, further cause the electronic device to determine at least a portion of a range in which the first field-of-view is movable as the fourth image.

19. The electronic device of claim 16, wherein instructions, when executed by the one or more processors individually or collectively, further cause the electronic device to determine the fourth image so that the moved first field-of-view is located at a center of the fourth image.

20. The electronic device of claim 16, wherein the instructions, when executed by the one or more processors individually or collectively, further cause the electronic device to display the third image on the second area of the display based on a magnification configured to be equal to or more than a designated magnification.

* * * * *